B. W. LOY.
CUTTER FOR LOOPING MACHINES.
APPLICATION FILED JAN. 24, 1917.
1,265,689.
Patented May 7, 1918.
3 SHEETS—SHEET 1.
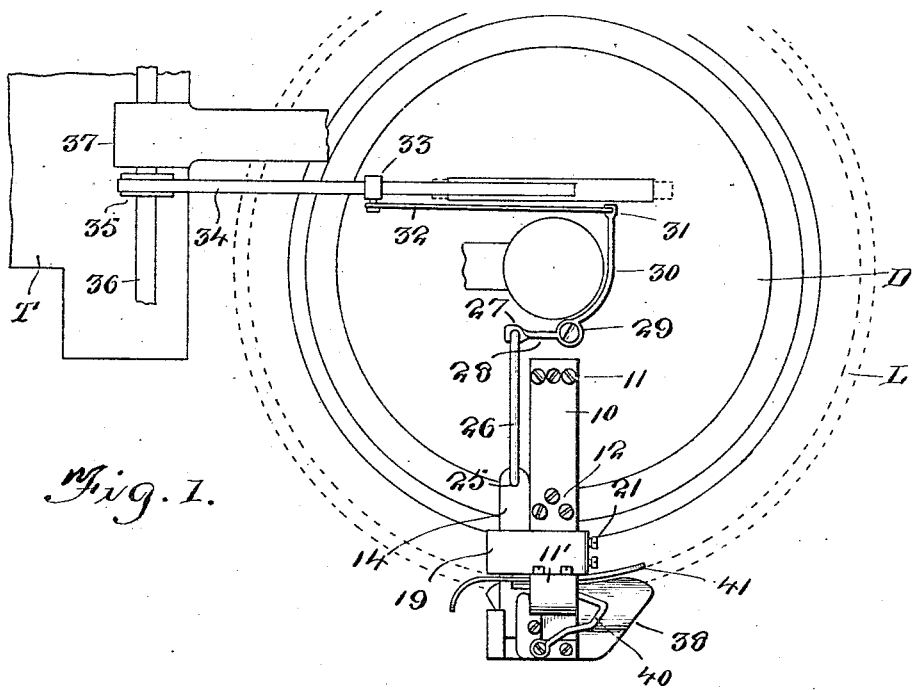
Fig. 1.
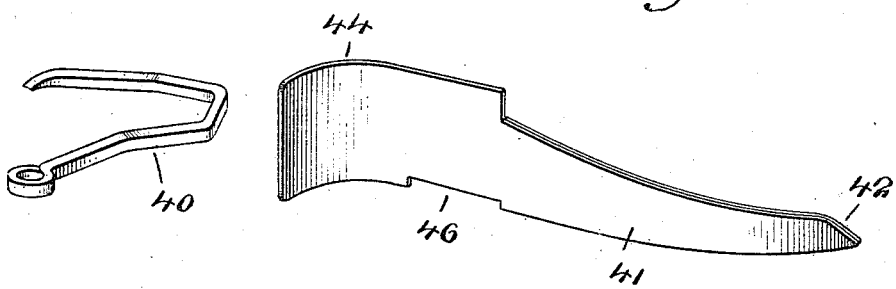
Fig. 9.
Fig. 10.
WITNESSES
INVENTOR
B. W. Loy
BY Victor J. Evans
ATTORNEY

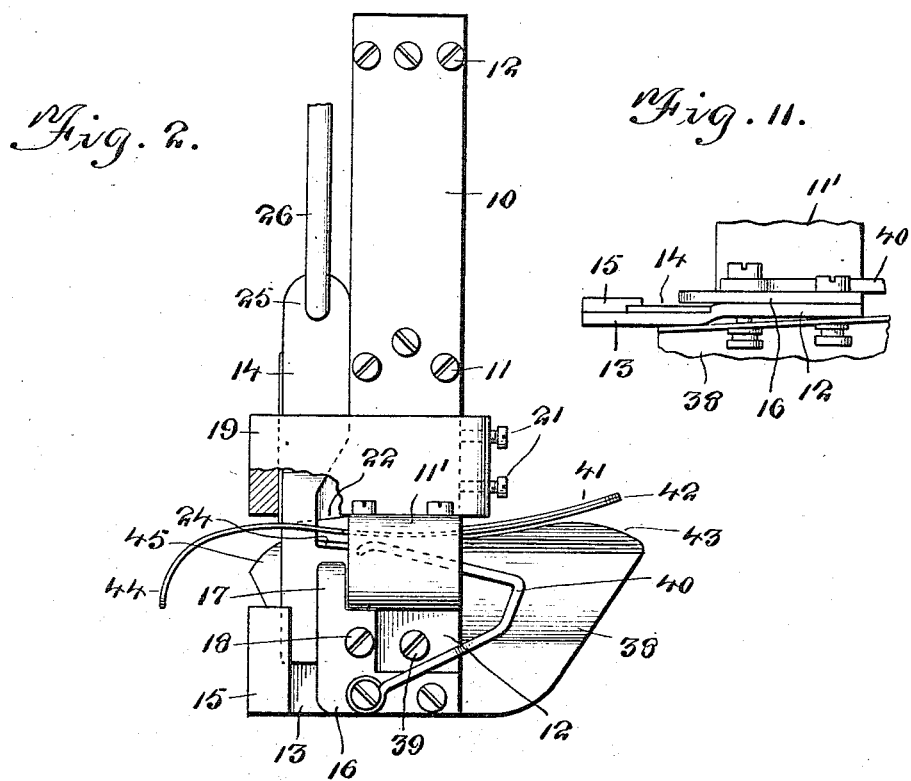
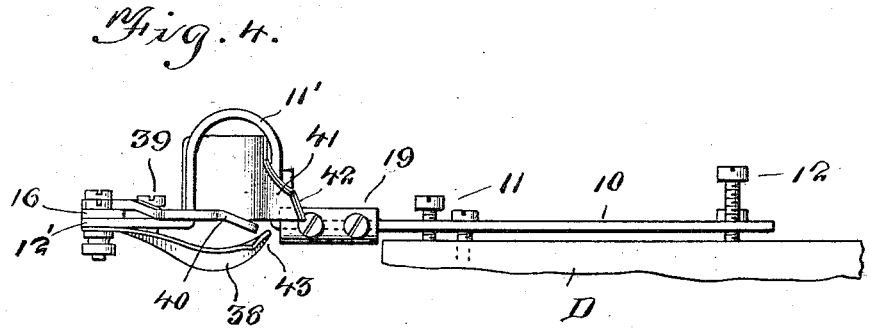

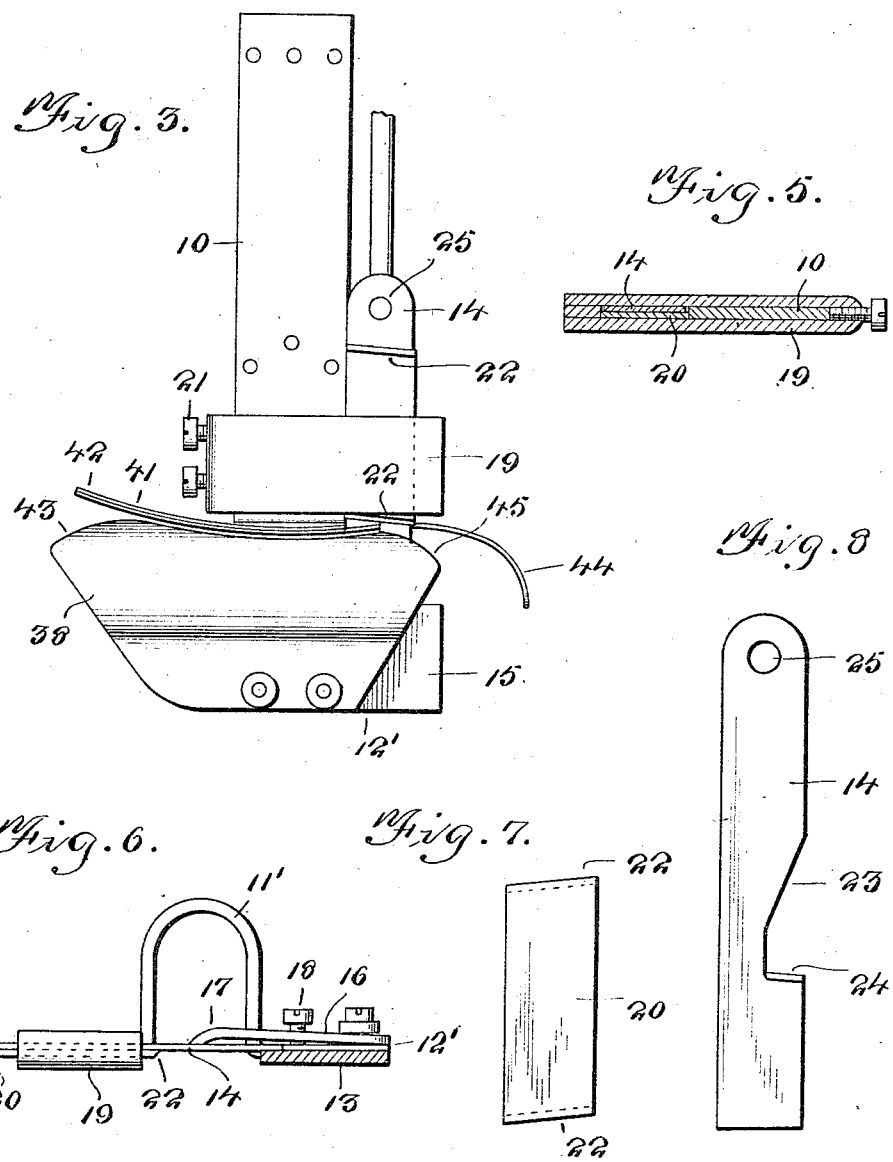

United States Patent Office.

BANKS W. LOY, OF GIBSONVILLE, NORTH CAROLINA.

CUTTER FOR LOOPING-MACHINES.

1,265,689.   Specification of Letters Patent.   Patented May 7, 1918.

Application filed January 24, 1917.   Serial No. 144,234.

*To all whom it may concern:*

Be it known that I, BANKS W. LOY, a citizen of the United States, residing at Gibsonville, in the county of Guilford and State of North Carolina, have invented new and useful Improvements in Cutters for Looping-Machines, of which the following is a specification.

This invention relates to cutters designed for use in connection with looping machines as used in the manufacture of hosiery and other knitted articles.

The object of the invention is the provision of a cutter of the above class which is provided with means for directing material to the cutting blades, the said means being so arranged as to permit of the passage of the material through the cutter when the looper is being operated either forward or backward.

Another object of the invention is to construct a cutter with removable operating blades and to provide means for adjusting and tensioning the said blades without stopping the operation of the looper, in order to avoid the loss of time incident thereto.

A further object is the provision of a cutter capable of being adapted to and supported upon the dial of a looping machine, the said cutter being of a size which will not interfere with the operation of the looper and being constructed so as to permit it to be easily taken apart for the purpose of removing lint or other substances which might collect thereon.

A still further object of the invention is the provision of a cutter embodying the above advantages, which is of simple and cheap construction and which is easy to operate the parts being so arranged as to permit of their being readily taken apart in order that worn or broken parts may be easily replaced.

With the above and other objects in view the invention consists broadly of a cutter comprising adjustable cutter blades, guiding elements for directing the material to the said blades, the said guiding element being so formed as to guide the said material therethrough irrespective of the direction of operation of the looper, tensioning means for the said blades, and means for operating the reciprocating blade of the cutter.

In the drawings:—

Figure 1 is a plan view of a portion of a looping machine having the improved cutter applied thereto, the cutter and its operating means and the dial of the looper being shown in full lines, while the remaining portion of the looping machine is shown by dotted lines.

Fig. 2 is an enlarged plan view of the cutter removed from the looping machine, a portion of the blade guide being broken away to show the blades.

Fig. 3 is a bottom plan view of the same;

Fig. 4 is an edge view looking at the cutter from its entrance side and showing the manner of attachment to the dial of the looping machine;

Fig. 5 is a cross sectional view through the cutter, taken through the blade guide and showing the manner of clamping therein the stationary blade;

Fig. 6 is a similar view taken on a line with the pressure adjusting screw for regulating the tension on the reciprocating blade;

Fig. 7 is a detail view of the stationary blade;

Fig. 8 is a similar view of the reciprocating blade;

Fig. 9 is a detail perspective view of the outer guiding finger; and

Fig. 10 is a similar view of the inner curved guiding bar.

Fig. 11 is a fragmentary elevation looking at the outer end of the cutter.

Referring to the drawings in detail, the looping machine is shown at L, its dial at D and the table for supporting the shaft which operates the pawl is shown at T.

The cutter comprises a supporting and adjusting plate 10, which is attached to the dial D by means of the screws 11 and 12, which screws also provide means for raising and lowering the plate for the purpose of adjusting the cutter with respect to the looper. The plate 10 is formed or provided with an arch 11′, the said arch being arranged to permit the passage of the fabric therethrough. The outer end of the plate 10 terminates in a supporting member 12, which is provided with a laterally depressed extension 13 to provide a guiding means for the reciprocating plate 14. Mounted upon the extreme end of the lateral extension 13 is a guide 15, which coöperates with the depressed portion of the extension to provide guiding means for one side of the blade. The opposite side of the blade is guided under a plate 16 provided with a tensioning finger 17 adapted to overlie the blade. The tension finger is adjusted by means of the screw 18, which is threaded into the plate 16 and bears upon the upper surface of the member 12'. By turning the screw inward, the plate 16 will lift the finger 17 from the blade and remove it from contact therewith. The inner end of the blade 14 passes through a blade guide 19 which is carried by the plate 10, and this guide also provides means for holding the stationary blade 20, which is located beneath the reciprocating blade. The guide 19 is in the form of a loop and embraces the plate 10 and the blades 14 and 20, and is provided upon one of its ends with a pair of screws 21 for the purpose of clamping into position the stationary blade. The ends 22 of the blade 20 are arranged at an angle with respect to the said blade and are both sharpened to permit the blade to be reversed and either end used. The reciprocating blade 14 is formed with a cut out portion 23 to provide a cutting edge 24 for coöperation with either of the cutting ends 22 of the blade 20.

The inner end of the blade 14 is provided with an aperture 25 for the reception of the bent end of a removable cutter blade connecting rod 26, the opposite end of this rod being engaged with an aperture 27 in the short arm 28 of a bell crank lever which is pivoted at 29 to the looper dial D. The long arm 30 of the bell crank is provided with an aperture 31 which receives the end of a connecting rod 32, whose opposite end is pivotally connected upon an adjustable sleeve 33 mounted upon the pawl 34. The pawl 34 is operated by the cam 35 carried by a shaft 36, which is mounted in bearings 37 secured to the table T. This shaft may receive its power from any suitable source for the purpose of reciprocating the pawl arm to which the bracket 33 is attached. This will in turn reciprocate the rod 32 and operate the bell crank, which will operate the connecting rod 26 to reciprocate the cutter blade 14. The rods 26 and 32 are both removable, being provided with angularly bent ends to permit their insertion in the apertures described and from which they may be readily removed, the position of these rods being such as to require no additional fastening means. This manner of connecting the blade 14 with the lever operating means permits the ready removal of the blade for the purpose of being sharpened, it not being necessary to disturb any of the other parts of the cutter.

Secured to the underside of the supporting member 12' by means of the screws which are used for attaching the tensioning plate 16 thereto, is a combined guard and guiding plate 38, the position of this plate with respect to the cutter being adjusted by means of the screw 39, which passes through the member 12 and bears upon the plate 38. Also carried by one of the screws just mentioned is an outer guiding finger 40, this finger being bent forward upon itself to extend under the arch 11' and shaped so as to guide the work when the machine is being turned either forward or backward. Secured to the inner wall of the arch 11', and located opposite the inner end of the guiding finger 40, is an inner curved guide bar 41, one end 42 of which coöperates with the curved end 43 of the plate 38 to provide an entrance for the work into the cutter. The opposite end of the bar is formed with an outwardly curved end 44 for the purpose of throwing the trimming off of the points of the looping machine. This end of the plate 38 is also provided with a curved portion 45, and the intermediate portion of this plate and of the guiding bar 41 are curved to conform to the circular formation of the looping machine. The bar 41 is provided with a notch 46 through which the blade 14 is adapted to reciprocate.

It is believed that from the foregoing description when taken in connection with the accompanying drawings, that the construction and operation of the cutter will be clearly understood by persons skilled in the art and that further description of its operation and advantages is unnecessary. It is also apparent that various changes in the form and proportion of the invention may be made and the right is reserved to make such changes.

Having described the invention what I claim is;

1. The combination with a looping machine, of a cutter comprising an attaching plate, a stationary cutter blade, a movable cutter blade, means for guiding the work to said blades and combined means including an adjusting element carried by the attaching plate for guiding and tensioning the movable cutter blade.

2. The combination with a looping machine, of a cutter comprising an attaching plate, a stationary cutter blade, a movable cutter blade, means for guiding the work to said blades, a guiding element carried by the attaching plate, an adjusting screw carried by said element and engageable with said plate for regulating the tension of the guiding element.

3. The combination with a looping machine, of a cutter comprising a movable cutter blade and a stationary cutter blade, guiding elements, a bell crank lever connected to the movable cutter blade and a cam operated pawl disposed at right angles to said movable blade for operating the same.

In testimony whereof I affix my signature.

BANKS W. LOY.

Copies of this patent may be obtained for five cents each, by addressing the "Commissioner of Patents, Washington, D. C."